Sept. 29, 1936. L. POTEMKIN 2,055,986
FLEXIBLE RAKE CONSTRUCTION
Filed March 19, 1934
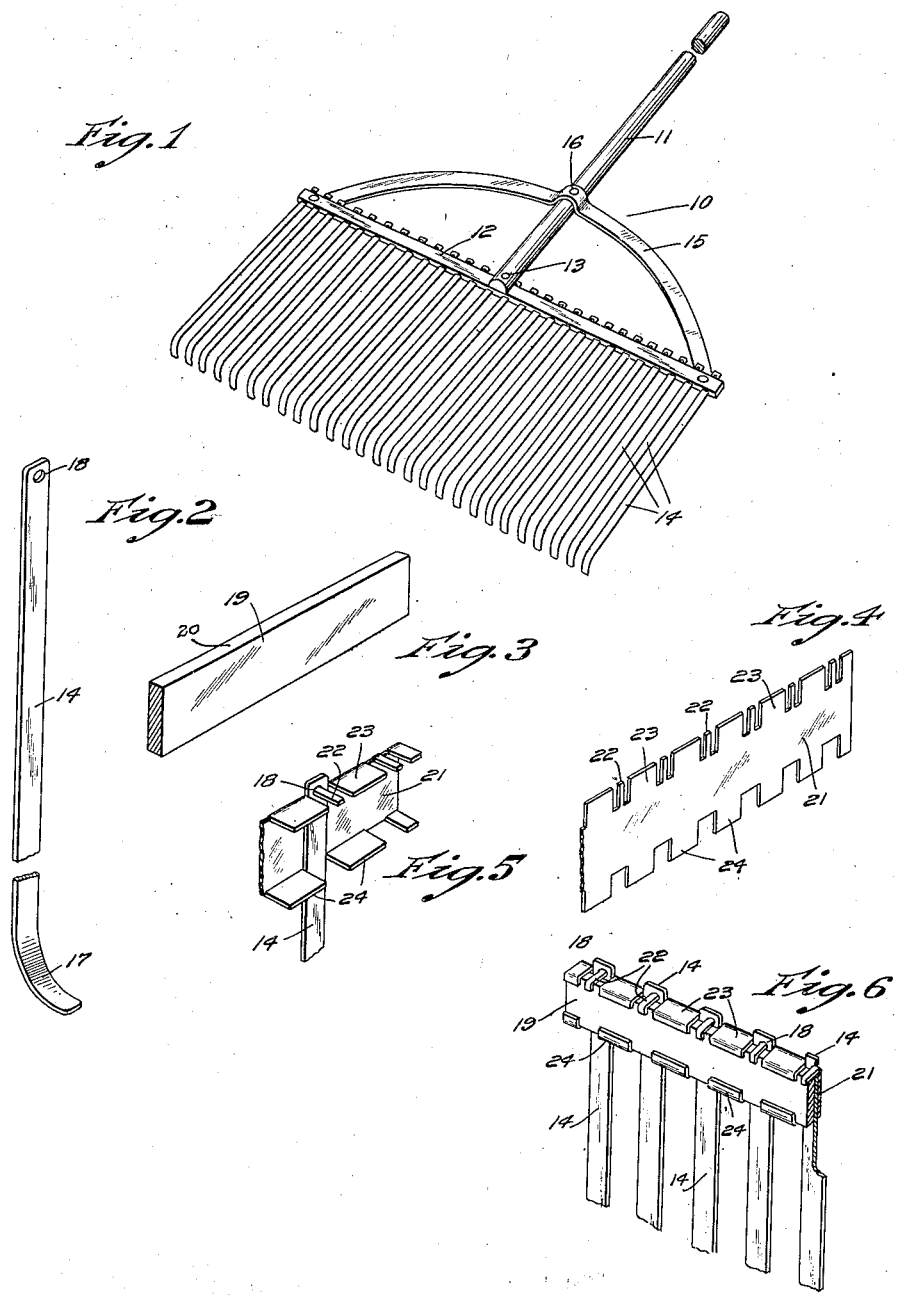

Patented Sept. 29, 1936

2,055,986

UNITED STATES PATENT OFFICE 2,055,986

FLEXIBLE RAKE CONSTRUCTION

Louis Potemkin, Pawtuxet, R. I.

Application March 19, 1934, Serial No. 716,287

3 Claims. (Cl. 55—114)

My present invention relates to the manufacture of rakes, and has particular reference to the construction of rakes equipped with flexible tines.

The rakes heretofore provided with flexible metal tines have utilized metal stampings, usually consisting of two tines joined by a flat strip at the base, these tines being punch riveted or otherwise secured between a folded over cross band. This construction has been found disadvantageous as the stampings are across the grain, rather than with the grain, for economy in stamping, and must be tempered before mounting in the cross band, whereby the tines do not possess maximum resilience and springiness. Moreover, the securing is not positive, and the tines have a tendency to become loose.

It is the principal object of my invention to devise a rake construction which rigidly holds individual tines in place, whereby the tines may be made of high grade tempered steel strips or steel tape, thus ensuring a high quality product at low manufacturing cost, with the grain in the direction of its length. The novel construction also permits manufacture of rakes having staggered tines, or having tines of steel wire.

With the above and other objects and advantageous features in view, my invention consists of a novel arrangement of parts more fully disclosed in the detailed description following, in conjunction with the accompanying drawing, and more specifically defined in the claims appended thereto.

In the drawing,

Fig. 1 is a perspective view of the novel rake, the handle being broken away;

Fig. 2 is a perspective view of one tine;

Fig. 3 is a perspective view of a fragmentary portion of the base plate;

Fig. 4 is a perspective view of a fragmentary portion of the lock plate;

Fig. 5 is a fragmentary perspective view of the tine and lock plate assembly; and Fig. 6 is a fragmentary perspective of the complete assembly.

I have developed a novel construction for rakes equipped with flexible tines, that simplifies manufacture and reduces the cost thereof, and that produces a stronger and more springy rake. My preferred construction utilizes individual tines which are cut from steel strip rolls and are simultaneously shaped, a base plate which is stamped from sheet metal, a lock plate which is also stamped from sheet metal, and a handle preferably of wood. The construction may be modified to utilize wire tines, and both types may have tines of uniform or of different length, as desired.

Specific embodiments of my invention are illustrated in the drawing, in which the rake 10, see Fig. 1, has a handle 11 that is slotted at the end to receive a tine base 12, a securing rivet 13 serving to lock the base to the handle. The tine base has a plurality of individual tines 14 mounted therein, as hereinafter described, and an arcuate brace rod 15 is riveted at its ends to the tine base, and is shaped at its center to engage the handle, to which it is secured by a rivet 16.

Each tine, see Fig. 2, has a curved end 17 of usual type, and has a pierced opening 18 in the other end. The tine base is formed of two parts, a base plate 19 having flat edges 20, and a lock plate 21 having a plurality of tine engaging fingers 22 and base strip engaging tabs 23 and 24.

To assemble the tines in the tine base, the tongues 22 and tabs 23, 24 are bent, the tines are mounted on the tongues as indicated in Fig. 5, and the assembly is then completed by turning the tabs 23 and 24 over the longitudinal edges 20 of the base plate, as illustrated in Fig. 6, this construction locking the tines solidly in place against both lateral and vertical movement. Since the tines are cut from spring stock, the resulting rake has a "live" feel not found in constructions utilizing stamped tines. Moreover, the tines may be of different lengths, so as to present a double row of bent ends, or to provide any other suitable design.

It is thus evident that my invention contemplates a rake construction utilizing simple parts which are readily assembled, and which are locked against displacement or looseness.

While I have described specific constructional embodiments of my invention, it is obvious that any desired changes in the material used, and in the relative arrangement and positioning of the parts, may be made to suit the requirements for different rake uses, without departing from the spirit and the scope of the invention as defined in the appended claims.

I claim:

1. In a tine assembly for a rake, a base plate, a lock plate having tine engaging tongues and base plate engaging tabs, and a plurality of tines, said tongues engaging said tines and said tabs engaging said base plate, to lock the tines against movement relative to said base plate.

2. In a tine assembly for a rake, a base plate, a lock plate having tine engaging fingers and base plate engaging tabs, and a plurality of tines having openings adjacent one end thereof, said tines being positioned between said plates, said fingers extending through said openings and said tabs engaging the base plate, to lock said tines against movement relative to the base plate.

3. In a tine assembly for a rake, a base plate member, an elongated lock plate member, spaced tine members engaging said base plate member, and cooperating means comprising lock tab receiving recesses on said tine members and tabs on said lock plate member engageable with said recesses and said base plate member for locking said tine members against relative movement with respect to said plate member.

LOUIS POTEMKIN.